United States Patent
Leamy et al.

(10) Patent No.: US 9,605,694 B2
(45) Date of Patent: Mar. 28, 2017

(54) ENERGY RECAPTURE SYSTEM FOR HYDRAULIC ELEVATORS

(71) Applicant: Georgia Tech Research Corporation, Atlanta, GA (US)

(72) Inventors: Michael J. Leamy, Atlanta, GA (US); Oscar Rafael Pena, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 320 days.

(21) Appl. No.: 14/576,862

(22) Filed: Dec. 19, 2014

(65) Prior Publication Data

US 2015/0176617 A1 Jun. 25, 2015

Related U.S. Application Data

(60) Provisional application No. 61/919,040, filed on Dec. 20, 2013.

(51) Int. Cl.
*F15B 21/14* (2006.01)
*F15B 1/02* (2006.01)
(Continued)

(52) U.S. Cl.
CPC ............... *F15B 21/14* (2013.01); *B66B 1/04* (2013.01); *B66B 9/04* (2013.01); *F15B 1/02* (2013.01);
(Continued)

(58) Field of Classification Search
CPC ............. F15B 21/14; B66B 1/04; B66B 9/04
(Continued)

(56) References Cited

U.S. PATENT DOCUMENTS 3,627,451 A 12/1971 Kouns
3,759,042 A * 9/1973 Shioda .................... F16H 39/02
60/435

(Continued)

FOREIGN PATENT DOCUMENTS

DE 201110108253 7/2011
KR 20120085623 A 1/2011
WO 2004026747 A1 4/2004

OTHER PUBLICATIONS

Hung: "A Study on the Position Control of Hydraulic Cylinder Driven by Hydraulic Transformer Using Disturbance Observer"; International Conference on Control, Automation and Systems 2008; Oct. 14, 2008.
(Continued)

*Primary Examiner* — Thomas E Lazo
(74) *Attorney, Agent, or Firm* — Bryan W. Bockhop; Bockhop Intellectual Property Law, LLC (57) ABSTRACT

In a method of driving a hydraulic system, a contracting force is applied to a hydraulic actuator, thereby causing hydraulic fluid from the hydraulic actuator to flow through a first hydraulic pump motor into a first accumulator, thereby causing the first hydraulic pump motor to apply rotational energy to a shaft. The rotational energy from the shaft is applied to a second hydraulic pump motor, thereby causing hydraulic fluid to be pumped from a second accumulator to a third accumulator so as to store energy in the third accumulator. Once energy is stored in the third accumulator, the second hydraulic pump motor is driven with hydraulic fluid stored in the third accumulator so as to apply rotational energy to the shaft, thereby driving the first hydraulic pump motor to pump hydraulic fluid from the first accumulator to the hydraulic actuator, thereby applying an expanding force to the hydraulic actuator.

20 Claims, 4 Drawing Sheets

(51) Int. Cl.
*B66B 1/04* (2006.01)
*B66B 9/04* (2006.01)

(52) U.S. Cl.
CPC ............... *F15B 2211/20507* (2013.01); *F15B 2211/20569* (2013.01); *F15B 2211/20576* (2013.01); *F15B 2211/212* (2013.01); *Y02B 50/146* (2013.01); *Y02B 50/148* (2013.01)

(58) Field of Classification Search
USPC .................................. 60/414, 416, 419, 435
See application file for complete search history.

(56) References Cited

U.S. PATENT DOCUMENTS

| | | | |
|---|---|---|---|
| 4,351,415 A | | 9/1982 | Kita |
| 4,489,812 A | | 12/1984 | Ferris |
| 6,378,301 B2 | * | 4/2002 | Endo ..................... E02F 9/2217 |
| | | | 60/414 |
| 6,823,671 B2 | * | 11/2004 | Achten ................. F02B 71/045 |
| | | | 60/413 |
| 6,971,481 B2 | * | 12/2005 | Moser ....................... B66B 9/04 |
| | | | 187/275 |
| 7,775,040 B2 | * | 8/2010 | Khalil ................... F15B 11/024 |
| | | | 60/414 |
| 8,240,143 B2 | | 8/2012 | Heren et al. |
| 8,251,148 B2 | | 8/2012 | von der Ohe |
| 8,362,629 B2 | | 1/2013 | Weber et al. |
| 8,429,907 B2 | * | 4/2013 | Gronli ..................... F15B 21/14 |
| | | | 60/414 |
| 8,453,762 B2 | | 6/2013 | Law et al. |
| 8,572,958 B2 | * | 11/2013 | Grethel ................. F15B 21/042 |
| | | | 60/435 |
| 8,593,012 B2 | | 11/2013 | Peitzke et al. |
| 2012/0297761 A1 | * | 11/2012 | Strognaov ........... F15B 11/0725 |
| | | | 60/512 |
| 2013/0195681 A1 | | 8/2013 | Meehan |
| 2013/0318955 A1 | | 12/2013 | Zhang et al. |
| 2013/0327030 A1 | | 12/2013 | Heren |

OTHER PUBLICATIONS

Bhosale et al.: Design and Development of Energy Efficient Lift-(Prototype); International Journal of Emerging Technology and Advanced Engineering; Jan. 2001-2013.

Xu et al.: "Energy-Saving System Applying Pressure Accumulators for VVVF Controlled Hydraulic Elevators"; ASME Proceedings | Fluid Power Systems Technology; Nov. 2003-2015.

Lifting Equipment: "Hydraulic elevator energy-saving energy recovery system design"; Hydraulic elevator energy-saving energy recovery system design; Apr. 2013-2016.

* cited by examiner

ENERGY RECAPTURE SYSTEM FOR HYDRAULIC ELEVATORS

CROSS-REFERENCE TO RELATED APPLICATION(S)

This application claims the benefit of U.S. Provisional Patent Application Ser. No. 61/919,040, filed Dec. 20, 2013, the entirety of which is hereby incorporated herein by reference.

BACKGROUND OF THE INVENTION

1. Field of the Invention

The present invention relates to hydraulic systems and, more specifically, to a hydraulic system that is configured to store and reuse energy.

2. Description of the Related Art

Many elevators are actuated by hydraulic systems. Typical hydraulically actuated elevators include a cab for transporting people and things. A hydraulic cylinder and piston move the cab up and down. To the cab is moved up by pumping hydraulic fluid from a reservoir into the cylinder and the cab is moved down by allowing hydraulic fluid to flow from the cylinder back into the reservoir.

Controlling the speed of the elevator can be challenging as people generally do not like abrupt starts and stops as the elevator ascends and descends. Several shortfalls exist in the speed-control systems currently employed in hydraulic systems. Most currently used speed-control systems employ two general approaches, each with its own advantages and disadvantages: (1) speed control via fluid throttling (typically implemented in some type of load sensing circuit) to regulate flow into the actuator; or (2) speed control employing an electric motor to control flow output of the pump. Throttling is easily and inexpensively implemented in a hydraulic system; however, energy dissipates throughout the motion of the actuator, thereby losing much of the energy employed to move the actuator. This can be a major source of inefficiency and tends to produce higher fluid requirements due to fluid heating. Speed control with an electric motor can be implemented with either a single speed electric drive operating a variable-displacement pump (displacement control), or with a fixed-displacement pump using a variable speed electric drive. Either approach can yield energy savings in comparison to throttling, and in some applications connected to a power grid (such as an elevator), the energy can be regenerated by converting some of the mechanical energy expended by the resistance of motion into electrical energy for storage in the power grid. However, this regeneration employs a relatively inefficient mechanical-to-electrical energy conversion and requires a mechanism for the electric utility company to reimburse the operator for returned electrical energy.

In a hydraulic elevator, motion can be adequately controlled through both throttling and displacement control. The most recent work on hydraulic elevators suggests regenerating energy through an electric motor converting mechanical to electrical energy. While an improvement over throttling, this energy conversion results in unacceptable inefficiencies.

In recent years hydraulic elevators have lost market share to other technologies. In 1986, hydraulic elevators comprised approximately 70% of all elevators sold in the US. By 1995, the market share began decreasing due to the introduction of machine room-less (MRL) traction elevators, recently reaching 40%. Additionally, traction elevators have long boasted a higher efficiency than hydraulic elevators as a result of the counterweight used to reduce the amount of net weight the motor experiences. Even on counterweighted hydraulic elevators, the throttling valve used during motion dissipates a significant amount of energy and negatively impacts the hydraulic elevator's efficiency. The recent loss in competitiveness, together with the assessment that 3-8% of electricity consumption of a building is attributed to elevator operation, provides sufficient motivation to improve current speed control and energy regeneration techniques in hydraulic elevators.

Therefore, there is a need for a hydraulic system that can be employed to actuate an elevator that can recapture, store and reuse energy from the elevator.

SUMMARY OF THE INVENTION

The disadvantages of the prior art are overcome by the present invention which, in one aspect, is a hydraulic system that includes a hydraulic actuator, a first accumulator, a first hydraulic pump motor, a shaft, a second accumulator, a third accumulator and a second hydraulic pump motor. The first hydraulic pump motor is in fluid communication with the first accumulator and is in fluid communication with the hydraulic actuator. The first hydraulic pump motor includes a first shaft coupling. The first hydraulic pump motor is configurable as a motor in which rotational energy is applied to the first shaft coupling as a result of hydraulic fluid moving from the first accumulator into the hydraulic actuator. The first hydraulic pump motor is also configurable as a pump in which rotational energy received from the first shaft coupling causes hydraulic fluid to be pumped from the hydraulic actuator into the first accumulator. The shaft is mechanically coupled to the first shaft coupling. The second hydraulic pump motor is in fluid communication with the third accumulator and is in fluid communication with the second accumulator. The second hydraulic pump motor includes a second shaft coupling mechanically coupled to the shaft. The second hydraulic pump motor is configurable as a pump in which rotational energy received from the second shaft coupling causes hydraulic fluid from the third accumulator to be pumped into the second accumulator thereby storing energy in the second accumulator. The second hydraulic pump motor is also configurable as a motor in which rotational energy is applied to the second shaft coupling as a result of hydraulic fluid from the second accumulator moving into the third accumulator, thereby releasing energy stored in the second accumulator to be applied to the shaft.

In another aspect, the first hydraulic pump motor is configurable as a motor in which rotational energy is applied to the first shaft coupling as a result of hydraulic fluid moving from the hydraulic actuator into the first accumulator as a result of a contracting force being applied to the hydraulic actuator. The first hydraulic pump motor is also configurable as a pump in which rotational energy received from the first shaft coupling causes hydraulic fluid to be pumped from the first accumulator into the hydraulic actuator thereby applying an expanding force to the hydraulic actuator. The shaft is mechanically coupled to the first shaft coupling. The second hydraulic pump motor is in fluid communication with the third accumulator and is in fluid communication with the second accumulator. The second hydraulic pump motor includes a second shaft coupling mechanically coupled to the shaft. The second hydraulic pump motor is configurable as a pump in which rotational energy received from the second shaft coupling causes hydraulic fluid from the second accumulator to be pumped into the third accumulator thereby storing energy in the third accumulator. The second hydraulic pump motor is also configurable as a motor in which rotational energy is applied to the second shaft coupling as a result of hydraulic fluid from the third accumulator into the second accumulator, thereby releasing energy stored in the third accumulator to be applied to the shaft.

In another aspect, the invention is an elevator that includes a platform, a hydraulic actuator, a first accumulator, a first hydraulic pump motor, a shaft, a second accumulator, a third accumulator, a second hydraulic pump motor, a controllable clutch and an auxiliary electric motor. The hydraulic actuator is configured to raise and lower the platform. The hydraulic actuator includes a cylinder coupled to a fixed location and a piston. The piston is disposed in the cylinder and is coupled to the platform. The piston is configured to have a vertical displacement relative to the cylinder corresponding to an amount of hydraulic fluid in the cylinder. The first hydraulic pump motor is in fluid communication with the first accumulator and is in fluid communication with the hydraulic actuator. The first hydraulic pump motor includes a first shaft coupling. The first hydraulic pump motor is configurable as a motor in which rotational energy is applied to the first shaft coupling as a result of hydraulic fluid moving from the hydraulic actuator into the first accumulator as a result of a contracting force being applied to the hydraulic actuator. The first hydraulic pump motor is also configurable as a pump in which rotational energy received from the first shaft coupling causes hydraulic fluid to be pumped from the first accumulator into the hydraulic actuator thereby applying an expanding force to the hydraulic actuator. The shaft is mechanically coupled to the first shaft coupling. The second hydraulic pump motor is in fluid communication with the third accumulator and is in fluid communication with the second accumulator. The second hydraulic pump motor is mechanically coupled to the shaft. The second hydraulic pump motor is configurable as a pump in which rotational energy received from the second shaft coupling causes hydraulic fluid from the second accumulator to be pumped into the third accumulator thereby storing energy in the third accumulator. The second hydraulic pump motor is also configurable as a motor in which rotational energy is applied to the second shaft coupling as a result of hydraulic fluid from the third accumulator moving into the second accumulator, thereby releasing energy stored in the third accumulator to be applied to the shaft. The controllable clutch selectively couples and decouples a first portion of the shaft from a second portion of the shaft. The auxiliary electric motor is mechanically coupled to the controllable clutch and is configured to provide supplemental energy to a selected one of the first hydraulic pump motor and the second hydraulic pump motor via the shaft.

In another aspect, the invention is a method of driving a hydraulic system, in which a contracting force is applied to a hydraulic actuator, thereby causing hydraulic fluid from the hydraulic actuator to flow through a first hydraulic pump motor into a first accumulator, thereby causing the first hydraulic pump motor to apply rotational energy to a shaft. The rotational energy from the shaft is applied to a second hydraulic pump motor, thereby causing hydraulic fluid to be pumped from a second accumulator to a third accumulator so as to store energy in the third accumulator. Once energy is stored in the third accumulator, the second hydraulic pump motor is driven with hydraulic fluid stored in the third accumulator so as to apply rotational energy to the shaft, thereby driving the first hydraulic pump motor to pump hydraulic fluid from the first accumulator to the hydraulic actuator, thereby applying an expanding force to the hydraulic actuator.

In yet another aspect, the invention is a hydraulic transformer that includes a first hydraulic pump motor, a shaft, a second hydraulic pump motor, and an auxiliary motor. The first hydraulic pump motor has a first primary port, a first secondary port, and a first shaft coupling. The first hydraulic pump motor being configurable as a motor in which rotational energy is output from the first shaft coupling as a result of hydraulic fluid moving from a high pressure environment into a first primary (or first secondary) port and out of a first secondary (or first primary) port at a low pressure environment. The first hydraulic pump motor also being configurable as a pump in which rotational energy input into the first shaft coupling causes hydraulic fluid to be pumped from a low pressure environment into a first primary (or first secondary) port and out of a first secondary (or first primary) port at a high pressure environment. The shaft is mechanically coupled to the first shaft coupling. The second hydraulic pump motor has a second primary port, a second secondary port, and a second shaft coupling mechanically coupled to the shaft. The second hydraulic pump motor is configurable as a pump in which rotational energy input into the second shaft coupling causes hydraulic fluid to be pumped from a low pressure environment into a second primary port (or second secondary) and out of a second secondary port (or second primary) at a high pressure environment. The second hydraulic pump motor is also configurable as a motor in which rotational energy is output from the second shaft coupling as a result of hydraulic fluid moving from a high pressure environment into a second primary port (or second secondary) and out of a second secondary port (or second primary) at a low pressure environment. The auxiliary motor is mechanically coupled to the shaft.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Figure 1A:
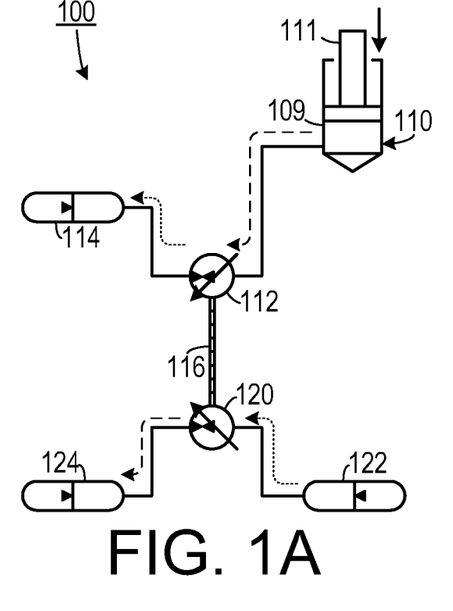
FIG. 1A-1B are schematic diagrams that show one representative embodiment of a hydraulic system and a method of operating the hydraulic system.
Figure 1B:
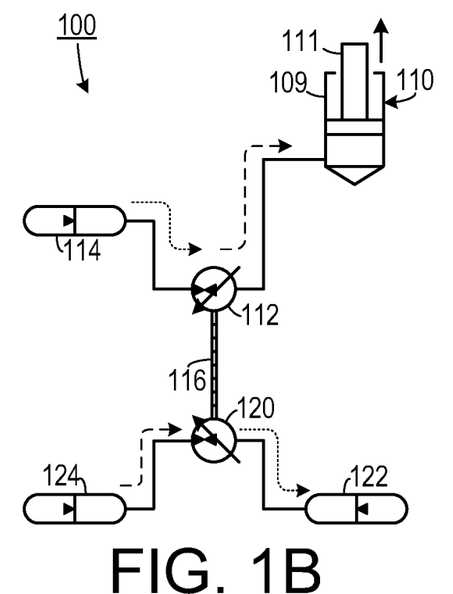
Figure 2:
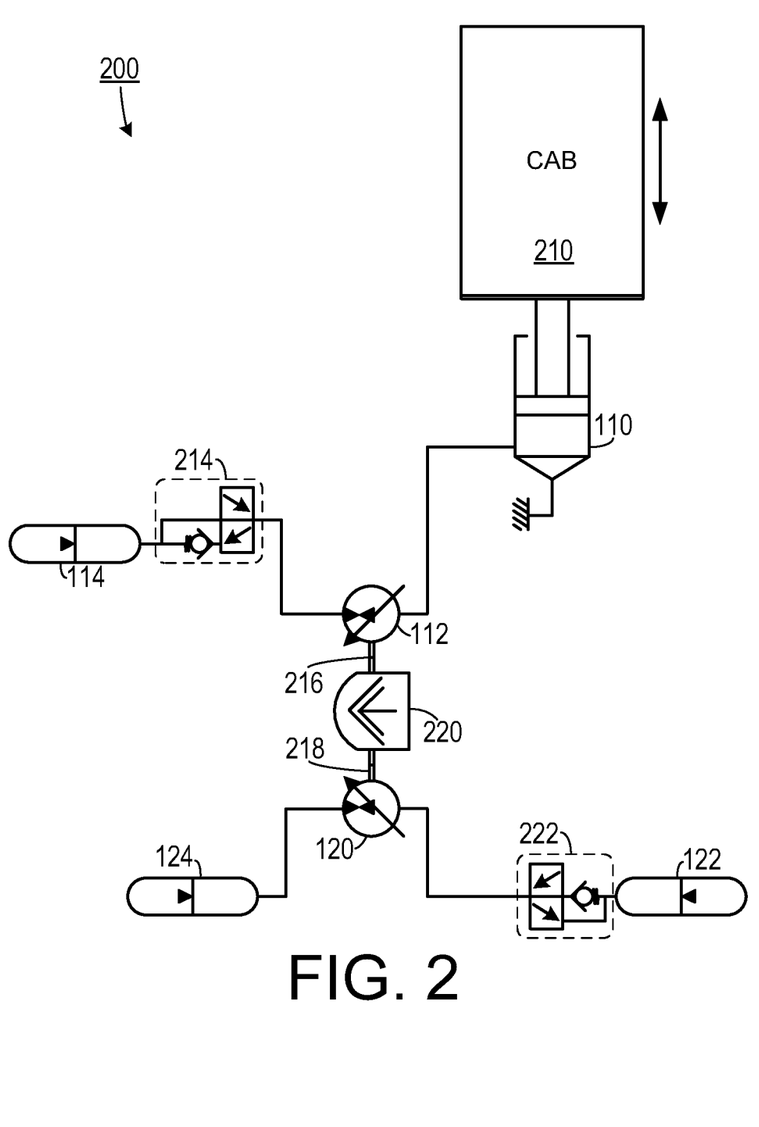
FIG. 2 is a schematic diagram of one embodiment of a hydraulically actuated elevator system.

As shown in FIGS. 1A-1B and 2, one representative embodiment is a hydraulic system 100 and a hydraulic actuated elevator system 200 that includes a hydraulic actuator 110, which includes a hydraulic cylinder 109 and a piston 111 that is configured to move between a contracted position and an extended position within the cylinder 109. A first hydraulic pump motor 112 (such as an axial piston hydraulic pump motor, which could be a variable displacement pump motor in one embodiment or a fixed displacement pump motor in other embodiments) that is in fluid communication with a first accumulator 114 and in fluid communication with the hydraulic actuator 110. A second hydraulic pump motor 120 in fluid communication with a third accumulator 124 and in fluid communication with a second accumulator 122. A shaft 116 mechanically couples the first hydraulic pump motor 112 to the second hydraulic pump motor 120. (While the term "accumulator" is used throughout this disclosure to describe hydraulic fluid storage devices, in certain embodiments a device referred to herein as an "accumulator" can include a reservoir or a low-pressure auxiliary accumulator.)

Generally, when hydraulic fluid flows is driven through a pump motor from a relatively high pressure source to a relatively low pressure environment, the pump motor acts as a motor and applies rotational energy to the shaft. When a hydraulic fluid is driven by the pump motor from a relatively low pressure source to a relatively high pressure environment as a result of rotational energy being applied to the pump motor, the pump motor acts as a pump that pumps the fluid into the high pressure environment.

When, as shown in FIG. 1A, in one embodiment hydraulic fluid flows from the second accumulator 122 through the second pump motor 120 into the third accumulator 124, the second pump motor 120 is configured as a motor and applies rotational energy to the shaft 116. This causes the first pump motor 112 to pump hydraulic fluid from the actuator 110 into the first accumulator 114, thereby contracting the piston 111 and storing energy in the first accumulator 114. To raise the piston 111, as shown in FIG. 1B, hydraulic fluid is allowed to flow from the first accumulator 114 through the first pump motor 112 into the actuator 110. This causes the first pump motor 112 to act as a motor and apply rotational energy to the shaft 116. This causes the second pump motor 120 to pump hydraulic fluid from the third accumulator 124 into the second accumulator 122, thereby storing energy in the second accumulator 122.

In an alternate embodiment, the piston 111 is lowered through the force of gravity, hydraulic fluid flows from the cylinder 109 through the first hydraulic pump motor 112 into the first accumulator 114. The first hydraulic pump motor 112 causes the shaft 116 to rotate, thereby causing the second hydraulic pump motor 120 to pump hydraulic fluid from the second accumulator 122 into the third accumulator 124, thereby increasing the pressure in the third accumulator 124 and storing energy therein. The next time that the piston 111 is to be driven upwardly, hydraulic fluid is allowed to flow from the third accumulator 124 through the second hydraulic pump motor 120 into the second accumulator 122. This causes the second hydraulic pump motor 120 to drive the first hydraulic pump motor 112 via the shaft 116, which causes the first hydraulic pump motor 112 to pump hydraulic fluid from the first accumulator 114 into the cylinder 109.

Thus, energy stored in the third accumulator 124 is used to drive the hydraulic actuator 110.

Figure 3:
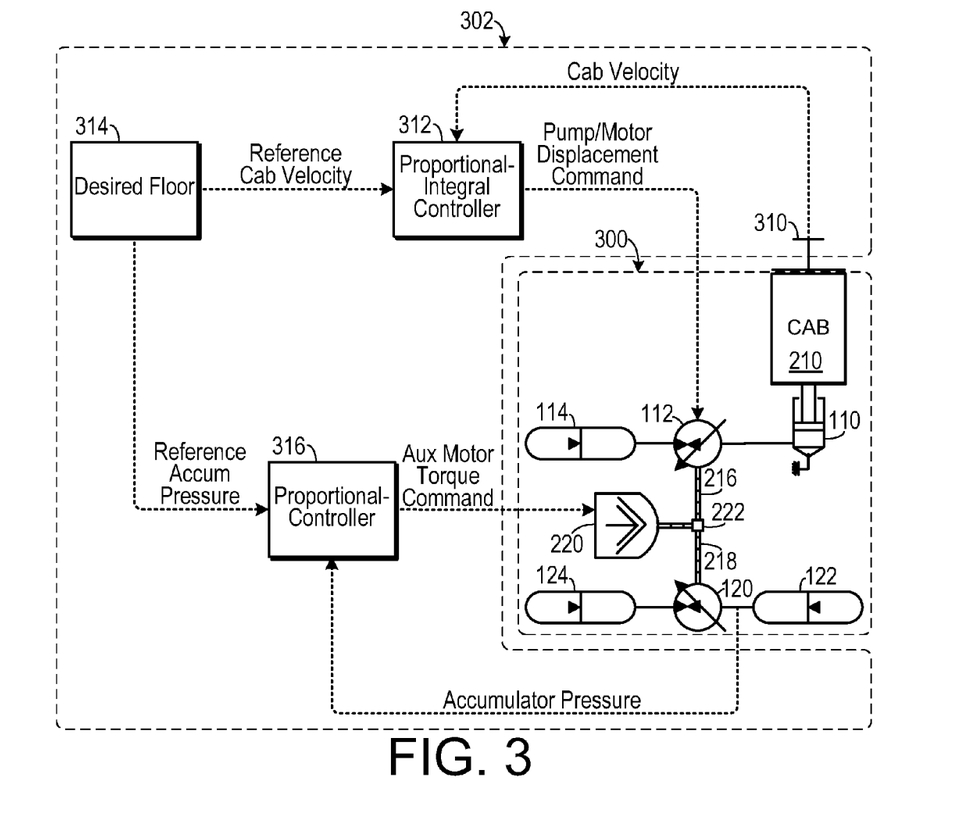
FIG. 3 is a schematic diagram of one embodiment of a controls system for an elevator actuator.

As shown in FIG. 2, one embodiment of an elevator system 200 employs this principle. In this system 200, the hydraulic actuator 110 drives a cab 210, which can carry people or cargo. In this embodiment, an auxiliary motor 220 (such as an electric motor or some other type of motor, depending on the specific application) is coupled to a first shaft portion 216 and a second shaft portion 218. The electric motor 220 replenishes energy that is lost due to parasitic losses of hydraulic circuit during normal operation by driving at least one of the first pump motor 112 and the second pump motor 120 to increasing input pressure into the second accumulator 122. A controllable clutch 222 (as shown in FIG. 3) can be employed to selectively couple and decouple the first portion 216 of the shaft from the second portion of the shaft 218. The auxiliary motor 220 can engage the shaft portions through the clutch.

Also, a first two way directional check valve 214 can be used to prevent oscillations in the hydraulic fluid flowing between the first accumulator 114 and the hydraulic actuator 110. Similarly, a second two way directional check valve 222 can be used to prevent oscillations in the hydraulic fluid flowing between the second accumulator 122 and third accumulator 124. As shown in FIG. 3, an elevator system 300 may employ a control system 302 used to adjust displacement of the hydraulic pump motors so as to control actuation rate in the hydraulic actuator 110. Such a system includes a cab location sensor 310, a first accumulator pressure sensor and a second accumulator pressure sensor. A desired floor indicator 314 generates a reference cab velocity signal, which is compared to an actual cab velocity signal by a proportional integral controller 312. The proportional integral controller 312 generates a pump/motor displacement control signal that adjusts the displacement of the first hydraulic pump motor 112 to achieve the desired activation rate. The desired floor indicator 314 also generates a reference accumulator pressure signal that indicates a desired second accumulator pressure based on the expected needs of the system, which is compared to the actual accumulator pressure by proportional controller 316. As a result, proportional controller 316 generates an auxiliary motor torque command, which causes the auxiliary motor 220 to add sufficient energy to achieve the desired accumulator pressure. Cab speed control can be effected by controlling the ratio of the displacements of the pump motors. In one embodiment, both pump motors are variable displacement pump motors. In another embodiment, the first pump motor 112 is variable displacement while the second pump motor 120 is fixed displacement. In yet another embodiment, the first pump motor 112 is fixed displacement while the second pump motor 120 is variable displacement.

Figure 4:
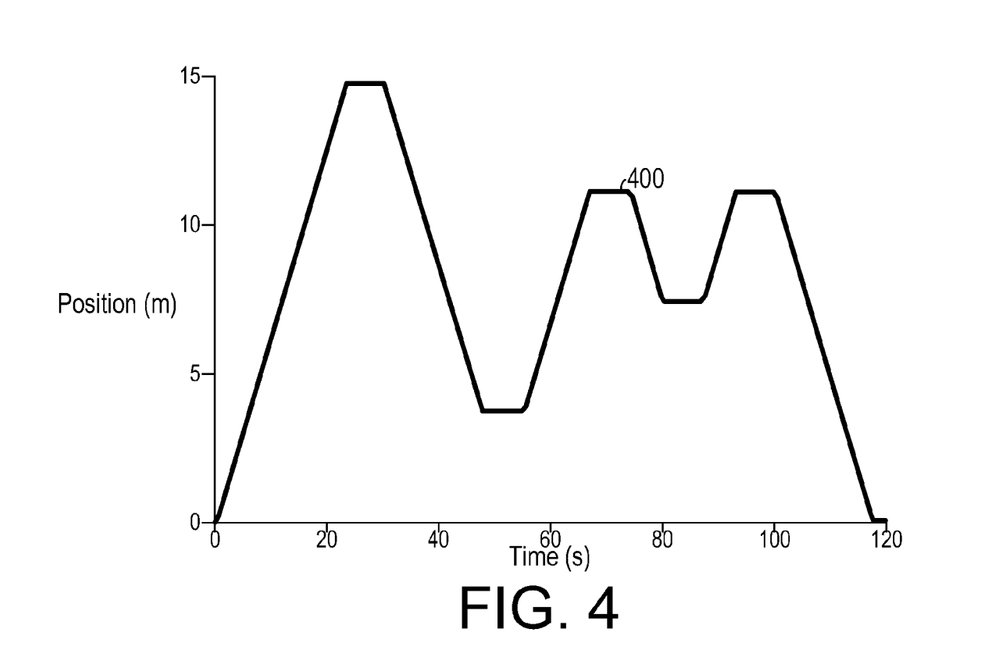
FIG. 4 is a chart showing vertical displacement of an elevator as a function of time.

The control system seeks to achieve a smooth actuator position profile 400, as shown in FIG. 4. The goal typically seeks to start and stop the actuator gradually and smoothly, while maximizing the speed of the cab between floors.

Figure 5:
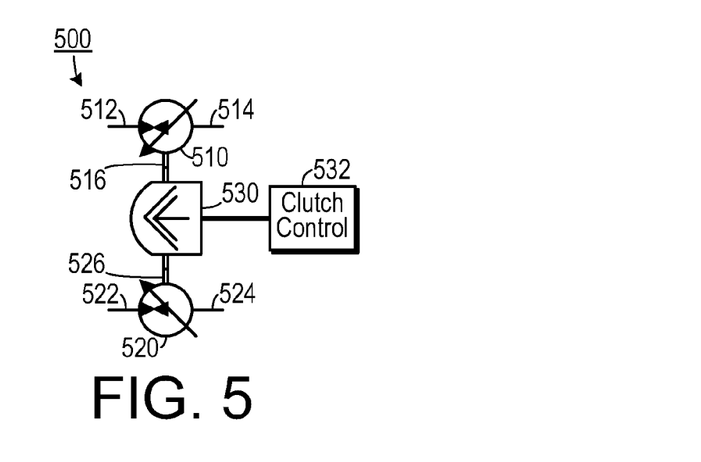
FIG. 5 is a schematic diagram of one embodiment of a hydraulic transformer.

As shown in FIG. 5, a hydraulic transformer 500 can be used in applications such as energy storage, hydraulic pressure conversion, hydraulic isolation, etc. In one representative embodiment, such a hydraulic transformer 500 can include a first hydraulic pump motor 510 that is coupled to a motor clutch assembly 530 via a first shaft portion 516. The first hydraulic pump motor 510 includes a first primary port 512 and a first secondary port 514. The first hydraulic pump motor 510 can be configured as a motor in which rotational energy is applied to the first shaft portion 516 as a result of hydraulic fluid moving from the first primary port 512 to the first secondary port 514. The first hydraulic pump motor can also be configured as a pump in which rotational energy received from the first shaft portion 516 causes hydraulic fluid to be pumped from the first secondary port 514 out through the first primary port 512. A second hydraulic pump motor 520 is coupled to the motor clutch assembly 530 via a second shaft portion 526. The second hydraulic pump motor 520 can be configured as a pump in which rotational energy received from the second shaft portion 526 causes hydraulic fluid to be pumped from second primary port 522 to a second secondary port 524. The second hydraulic pump motor can also be configured as a motor in which rotational energy is applied to the second shaft portion 526 as a result of hydraulic fluid moving from the second secondary port 524 to the second primary port 522. The motor clutch assembly 530 includes an auxiliary motor (e.g., and electric motor) that is mechanically coupled to a clutch and can be used to add energy to the system to compensate for losses. A clutch controller 532 causes the clutch to operating on one of three states, including: a first state in which the first shaft portion is mechanically coupled to the second shaft portion; a second state in which the first shaft portion is mechanically coupled to the auxiliary motor; and a third state in which the second shaft portion is mechanically coupled to the auxiliary motor. The pump motors 510 and 520 can be variable displacement axial piston pump motors and can be controlled by varying the angle of the swash plates in the pump motors.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A hydraulic system, comprising:
   (a) a hydraulic actuator;
   (b) a first accumulator;
   (c) a first hydraulic pump motor in fluid communication with the first accumulator and in fluid communication with the hydraulic actuator, the first hydraulic pump motor including a first shaft coupling, the first hydraulic pump motor being configurable as a motor in which rotational energy is applied to the first shaft coupling as a result of hydraulic fluid moving from the first accumulator into the hydraulic actuator, the first hydraulic pump motor also being configurable as a pump in which rotational energy received from the first shaft coupling causes hydraulic fluid to be pumped from the hydraulic actuator into the first accumulator;
   (d) a shaft mechanically coupled to the first shaft coupling;
   (e) a second accumulator;
   (f) a third accumulator; and
   (g) a second hydraulic pump motor in fluid communication with the third accumulator and in fluid communication with the second accumulator, the second hydraulic pump motor including a second shaft coupling mechanically coupled to the shaft, the second hydraulic pump motor being configurable as a pump in which rotational energy received from the second shaft coupling causes hydraulic fluid from the third accumulator to be pumped from the third accumulator into the second accumulator thereby storing energy in the second accumulator, the second hydraulic pump motor also being configurable as a motor in which rotational energy is applied to the second shaft coupling as a result of hydraulic fluid from the second accumulator moving into the third accumulator, thereby releasing energy stored in the second accumulator to be applied to the shaft.

2. The hydraulic system of claim 1, wherein the first hydraulic pump motor comprises an axial piston variable displacement hydraulic pump motor.

3. The hydraulic system of claim 1, wherein the second hydraulic pump motor comprises an axial piston variable displacement hydraulic pump motor.

4. The hydraulic system of claim 1, further comprising a control system configured to adjust displacement of at least one of the first hydraulic pump motor and the second hydraulic pump motor so as to control a rate of hydraulic fluid transfer therethrough.

5. The hydraulic system of claim 1, further comprising an auxiliary motor, configured to provide supplemental energy to a selected one of the first hydraulic pump motor and the second hydraulic pump motor via the shaft.

6. The hydraulic system of claim 5, wherein the auxiliary motor comprises an electric motor.

7. The hydraulic system of claim 1, further comprising a first two way directional check valve that couples the first accumulator to the first hydraulic actuator that is configured to prevent oscillations in the hydraulic fluid.

8. The hydraulic system of claim 1, further comprising a second two way directional check valve that couples the second accumulator to the third accumulator that is configured to prevent oscillations in the hydraulic fluid.

9. The hydraulic system of claim 1, further comprising an elevator cab that is coupled to the hydraulic actuator.

10. A hydraulic system, comprising:
    (a) a hydraulic actuator;
    (b) a first accumulator;
    (c) a first hydraulic pump motor in fluid communication with the first accumulator and in fluid communication with the hydraulic actuator, the first hydraulic pump motor including a first shaft coupling, the first hydraulic pump motor being configurable as a motor in which rotational energy is applied to the first shaft coupling as a result of hydraulic fluid moving from the hydraulic actuator into the first accumulator as a result of a contracting force being applied to the hydraulic actuator, the first hydraulic pump motor also being configurable as a pump in which rotational energy received from the first shaft coupling causes hydraulic fluid to be pumped from the first accumulator into the hydraulic actuator thereby applying an expanding force to the hydraulic actuator;
    (d) a shaft mechanically coupled to the first shaft coupling;
    (e) a second accumulator;
    (f) a third accumulator; and
    (g) a second hydraulic pump motor in fluid communication with the third accumulator and in fluid communication with the second accumulator, the second hydraulic pump motor including a second shaft coupling mechanically coupled to the shaft, the second hydraulic pump motor being configurable as a pump in which rotational energy received from the second shaft coupling causes hydraulic fluid from the second accumulator to be pumped into the third accumulator thereby storing energy in the third accumulator, the second hydraulic pump motor also being configurable as a motor in which rotational energy is applied to the second shaft coupling as a result of hydraulic fluid from the third accumulator into the second accumulator, thereby releasing energy stored in the third accumulator to be applied to the shaft.

11. The hydraulic system of claim 10, wherein the first hydraulic pump motor comprises an axial piston variable displacement hydraulic pump motor.

12. The hydraulic system of claim 10, wherein the second hydraulic pump motor comprises an axial piston variable displacement hydraulic pump motor.

13. The hydraulic system of claim 10, further comprising a control system configured to adjust displacement of at least one of the first hydraulic pump motor and the second hydraulic pump motor so as to control a rate of hydraulic fluid transfer therethrough.

14. The hydraulic system of claim 10, further comprising an auxiliary motor, configured to provide supplemental energy to a selected one of the first hydraulic pump motor and the second hydraulic pump motor via the shaft.

15. The hydraulic system of claim 14, wherein the auxiliary motor comprises an electric motor.

16. The hydraulic system of claim 10, further comprising a first two way directional check valve that couples the first accumulator to the first hydraulic actuator that is configured to prevent oscillations in the hydraulic fluid.

17. The hydraulic system of claim 10, further comprising a second two way directional check valve that couples the second accumulator to the third accumulator that is configured to prevent oscillations in the hydraulic fluid.

18. The hydraulic system of claim 10, further comprising an elevator cab that is coupled to the hydraulic actuator.

19. A hydraulic transformer, comprising:
(a) a first hydraulic pump motor having a first primary port, a first secondary port, and a first shaft coupling, the first hydraulic pump motor being configurable as a motor in which rotational energy is applied to the first shaft coupling as a result of hydraulic fluid moving from a high pressure environment at the first primary port through the first secondary port to a low pressure environment, the first hydraulic pump motor also being configurable as a pump in which rotational energy received from the first shaft coupling causes hydraulic fluid to be pumped from a low pressure environment at the first secondary port out through the first primary port to a high pressure environment;
(b) a first shaft portion mechanically coupled to the first shaft coupling;
(c)
(d) a second shaft portion mechanically coupled to the first shaft portion;
(e) a second hydraulic pump motor having a second primary port, a second secondary port, and a second shaft coupling mechanically coupled to the second shaft portion, the second hydraulic pump motor being configurable as a pump in which rotational energy received from the second shaft coupling causes hydraulic fluid to be pumped from a low pressure environment at the second primary port through the second secondary port to a high pressure environment, the second hydraulic pump motor also being configurable as a motor in which rotational energy is applied to the second shaft coupling as a result of hydraulic fluid moving from a high pressure environment at the second primary port through the second primary port to a low pressure environment;
(f) an auxiliary motor mechanically coupled to the clutch; and
(g) a clutch controller, configured to cause the clutch to operating on one of three states, including:
(i) a first state in which the first shaft portion is mechanically coupled to the second shaft portion;
(ii) a second state in which the first shaft portion is mechanically coupled to the auxiliary motor; and
(iii) a third state in which the second shaft portion is mechanically coupled to the auxiliary motor.

20. The hydraulic transformer of claim 19, wherein the auxiliary motor comprises an electric motor.

* * * * *

UNITED STATES PATENT AND TRADEMARK OFFICE
CERTIFICATE OF CORRECTION

| | | |
|---|---|---|
| PATENT NO. | : 9,605,694 B2 | Page 1 of 1 |
| APPLICATION NO. | : 14/576862 | |
| DATED | : March 28, 2017 | |
| INVENTOR(S) | : Michael J. Leamy and Oscar Rafael Pena | |

It is certified that error appears in the above-identified patent and that said Letters Patent is hereby corrected as shown below:

In the Specification

Column 1, Line 11 - after "herein by reference." please insert:

--STATEMENT REGARDING FEDERALLY SPONSORED RESEARCH
This invention was made with Government support under Contract Number EEC0540834, awarded by the National Science Foundation. The Government has certain rights in the invention.--

Signed and Sealed this
Fifth Day of June, 2018

Andrei Iancu
*Director of the United States Patent and Trademark Office*